Jan. 7, 1930. R. O. HOOD Re. 17,560

ACOUSTIC SIGNALING DEVICE

Original Filed Feb. 28, 1925 2 Sheets-Sheet 1

INVENTOR
Ralph O. Hood.
BY Moore & Nolte
ATTORNEYS

Jan. 7, 1930. R. O. HOOD Re. 17,560

ACOUSTIC SIGNALING DEVICE

Original Filed Feb. 28, 1925 2 Sheets-Sheet 2

INVENTOR
Ralph O. Hood.
BY Moser & Nolte
ATTORNEYS

Reissued Jan. 7, 1930 Re. 17,560

UNITED STATES PATENT OFFICE

RALPH O. HOOD, OF DANVERS, MASSACHUSETTS, ASSIGNOR, BY MESNE ASSIGNMENTS, TO THE BOYMOTO COMPANY, INC., OF NEW YORK, N. Y., A CORPORATION OF NEW YORK

ACOUSTIC SIGNALING DEVICE

Original No. 1,669,827, dated May 15, 1928, Serial No. 12,423, filed February 28, 1925. Application for reissue filed April 9, 1929. Serial No. 353,869.

This invention relates to acoustic signaling devices and especially to horns for vehicles and has for an object the provision of a horn so constructed and arranged as to emit a distinctive and pleasing signal.

A further object of the invention is generally to improve the construction and operation of acoustic signaling devices.

Fig. 8 is an enlarged detail view showing portions of said contact structure.

Figure 1:
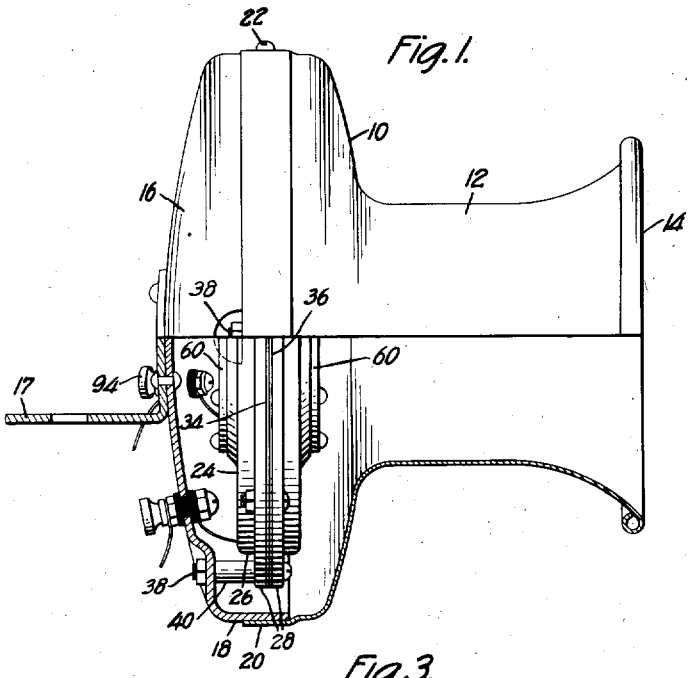
Fig. 1 is a side elevational view, partly cut away, of an electrically actuated horn embodying the invention.

As here shown, the horn embodying the invention may include a casing having an enlarged cylindrical rear portion 10 and a reduced neck 12 extended forwardly from the enlarged cylindrical portion and terminated in an open mouth 14. The cylindrical portion 10 of the casing may include the rear wall 16 which wall is adapted to support the horn mechanism and comprises the rear closure for the casing. Said wall may be preferably internally concave and it is formed or provided with an annular cylindrical flange 18. Said flange is adapted to fit within a corresponding flange 20 of the casing and be suitably detachably secured thereto by suitable means as the screws 22.

The sound-producing mechanism is disposed within the enlarged cylindrical portion 10 of the enclosing casing and comprises essentially a drum having two opposed and spaced vibratory heads or diaphragms, between which is enclosed mechanism for vibrating them simultaneously.

As here shown, the drum includes a rear diaphragm or head 24 and a forward diaphragm or head 26 spaced from the diaphragm 24. Said diaphragms may be composed of suitable material as, for instance, sheet steel, and may be approximately identical in vibratory characteristics so that both may have substantially the same period of vibration. If desired, however, one of the diaphragms may be different than the other in an obvious manner and so proportioned with respect to the other that it will vibrate at some rate which bears such a relation to the vibratory period of the other that the resultant tone is composed of two mutually harmonizing notes and pleasing overtones thereof.

Figure 2:
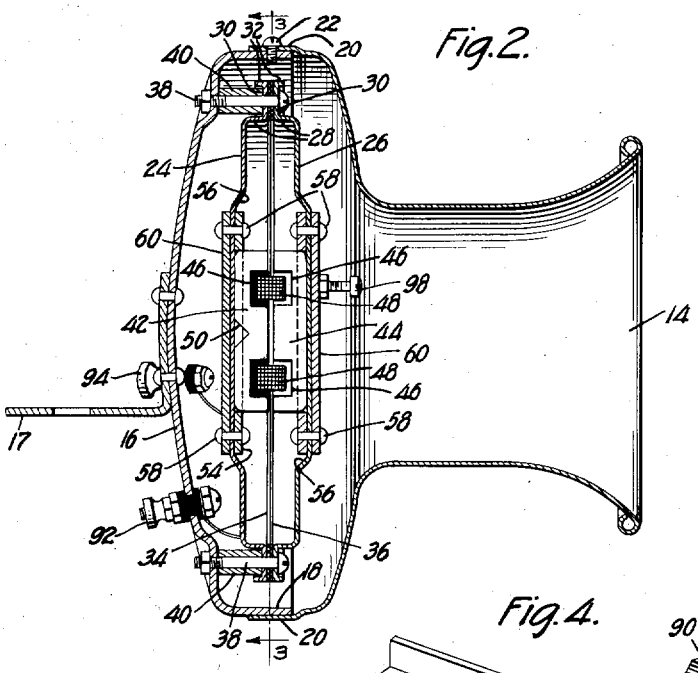
Fig. 2 is a longitudinal sectional elevational view of the horn shown in Fig. 1.
Figure 4:
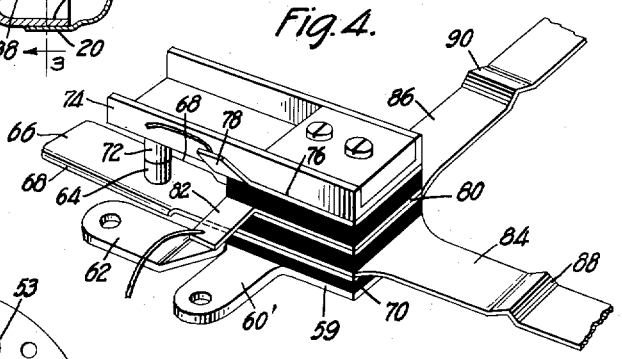
Fig. 4 is a perspective view of a contact structure, which may be embodied in the horn as shown.
Figure 5:
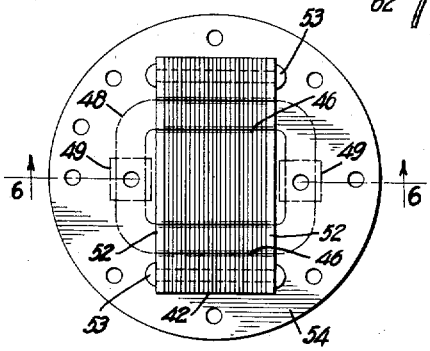
Fig. 5 is a plan view of a portion of an electromagnet structure such as may be used in the horn shown.
Figure 7:
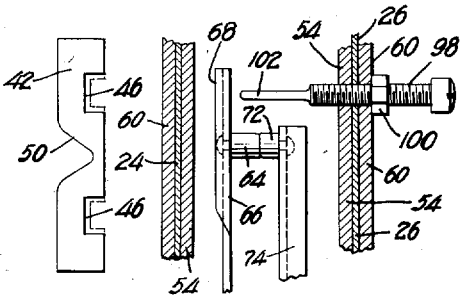
Fig. 7 is a side elevational view of a magnet core adapted for use with one of the vibratory diaphragms of the horn shown.

The diaphragms may be each provided with inturned rims 28 and with flanges 30 outstanding from said rims. The diaphragms may also be formed with axially extended circumferential flanges 32 at the edges of said radially extending flanges 30 for strengthening the diaphragm structure. The two diaphragms may be secured together as shown in Fig. 2 with the flanges 30 juxtaposed. Two separate gaskets 34 and 36 may be interposed between the diaphragm flanges 30 to seal the enclosed space in a practically gas tight manner. The diaphragms may be clamped rigidly together in the relation illustrated in Fig. 2 by suitable means as screws 38. Certain of said screws may extend through the rear wall 16 of the enclosing casing and spacing tubes 40 may be disposed on said screws and interposed between the drum and said wall 16 for supporting said drum rigidly in respect to the rear wall of the casing and in spaced relation thereto so that there is a free acoustic passage between the inner diaphragm and the rear wall 16 and around the periphery of the drum to the neck 12 of the casing. A suitable supporting bracket 17 may be secured to the rear wall 16 or, if desired, the screws 38 may extend directly to a support, the horn casing being then omitted.

Figure 6:
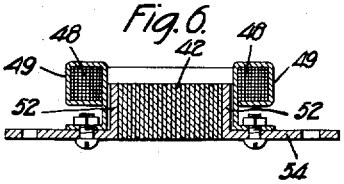
Fig. 6 is a sectional elevational view taken substantially along lines 6—6 of Fig. 5.

The electrically actuated mechanism for the diaphragms is contained between the diaphragms and is thereby substantially sealed against dust and moisture. The actuating mechanism may include an electromagnet composed of two relatively flat laminated cores 42 and 44, which cores may be carried directly upon the diaphragms 24 and 26 respectively. Said cores may be formed or provided with opposed and spaced slots 46 therein in which an energizing winding 48 is received. Said energizing winding is adapted to be fixed in the slots of one of said cores as the slots of core 42 and to protrude into the slots of, but being free from contact with, the core 44, thus permitting the two diaphragms to vibrate independently. Since the energizing coil 48 is carried by and thereby loads the diaphragm 24, it is desirable to compensate for the weight of the coil, and this is most conveniently done by removing an approximately equivalent weight of material from the core 42, as by forming a notch 50 therein of suitable dimensions. The laminations of the cores may be secured in any well known manner or disposed between and secured to ears 52 which are struck out from a supporting disc 54; each core being provided with such a disc. Fastening rivets 53 may extend through the laminations and the ear portions. The coil may be held in place by suitable bracket members 49 embracing the coil and bolted to the disc 54 (see Fig. 6). Said discs may be received in circular depressions or recesses 56 in the diaphragms and are secured in such relation by suitable means as rivets 58 passing through said discs and the diaphragm and through backing plates 60.

The magnet cores 42 and 44 are adapted to be maintained normally in spaced relation as shown in Fig. 2 and are adapted to be attracted toward each other when the coil 48 is energized and the core, thereby, is magnetized. A make and break circuit controller may be provided to maintain the diaphragms in rapid vibration when the circuit through the energizing coil is otherwise completed; and said make and break mechanism is governed by the movements of the diaphragm. Said make and break mechanism may include a bracket 59 which is provided with ears 60′ and 62, which ears are attached to one of the plates 54, as the plate carried by the rear diaphragm 24. A movable contact member 64 is fixed to a flexible flat spring-member 66 and said spring-member may be formed with reflexed side edges 68 which serve to stiffen said member at the area around the contact member. Said spring-member is carried by and is insulated from the bracket 59 by the insulating block 70. A stationary contact member 72 is secured to and carried by a channel member 74, which channel member may be also carried by the bracket 59. A metal plate 76 is disposed beneath and in electrical contact with the channel member 74 and said plate is formed with an outwardly extended ear 78 to which one of the terminals of the magnet coil 48 is adapted to be secured. A similar plate 80 may be carried by the bracket 59 between and insulated from the contact member supports; and said plate is formed with a similar ear 82 to which the other terminal of the coil 48 is adapted to be connected.

Figure 3:
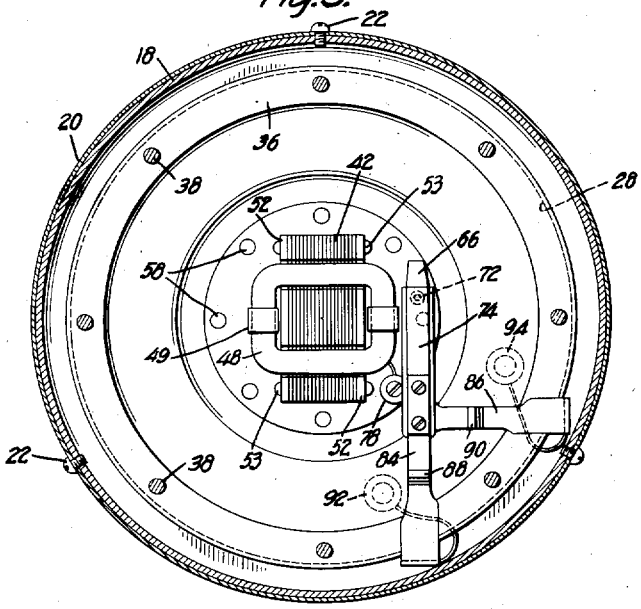
Fig. 3 is a transverse sectional elevational view taken substantially along line 3—3 of Fig. 2.

The terminal leads may comprise conductors of suitable form such as flat and flexible conducting strips 84 and 86 which are connected respectively with the spring member 66 and the plate 80. Said terminal leads are or may be provided with intermediate reflexed portions 88 and 90 to enhance the flexibility of the leads and permit them to flex readily in response to vibratory movements of the diaphragms. Said terminal leads 84 and 88 may be extended outwardly at approximate right angles as shown at Fig. 3 and between the two packing gaskets 34 and 36 and may be connected electrically to appropriate terminals 92 and 94 carried by the rear wall of the enclosing casing.

The engagement and disengagement of the contact members may be controlled by relative vibration of the diaphragms. For this purpose, a screw 98 may be adjustably screw-threaded through the diaphragm 26 and also through plates 54 and 60 and may be locked in any set position by a check nut 100. Said screw is provided with a rod 102 of insulating material in its end and said rod is adapted to be disposed to engage the spring member 66 and separate the contact members when the diaphragms have been moved inwardly a predetermined distance thereby to break the energizing circuit.

As thus arranged both the adjusting screw and the contact members move inwardly and outwardly toward and away from each other with one cycle of movement for each vibration of the diaphragms. The adjusting screw is preferably so disposed as to be accessible through the open end of the horn.

The structure herein shown in exceedingly simple and strong and unlikely to get out of order. Both diaphragms are vibrated simultaneously and the device emits a pleasing yet penetrating note of marked carrying power.

While the invention has been described in detail with respect to a certain particular preferred example which gives satisfactory results, it will be understood by those skilled in the art after understanding the invention that various changes and modifications may be made without departing from the spirit and scope of the invention, and it is intended therefore, in the appended claims to cover all such changes and modifications.

What is claimed as new and is desired to be secured by Letters Patent of the United States is:

1. An acoustic signaling device including a pair of spaced independently-vibratory diaphragms having means rigidly uniting the peripheries thereof, and actuating mechanism for said diaphragms comprising an electro-magnet structure disposed between and having parts separately carried respectively by the free middle portions of said diaphragms.

2. A warning horn including a pair of independently-vibratory diaphragms disposed in relatively closely spaced and generally parallel relation, means rigidly uniting the peripheral portions thereof to form a substantially closed compartment between the diaphragms, means including a projector-casing surrounding and peripherally-spaced from and supporting said diaphragms at the peripheral portions thereof with the bodies of said diaphragms mechanically substantially free to vibrate independently, and actuating means for said diaphragms disposed within said compartment.

3. An acoustic signaling device including a pair of diaphragms disposed in relatively closely spaced relation with their peripheral portions brought substantially together and united to form a substantially closed compartment between the diaphragms, means supporting said diaphragms at the peripheries thereof with their central areas free to independently vibrate, and electro-magnetic actuating means for said diaphragms disposed within said compartment.

4. An acoustic signaling device including a pair of diaphragms disposed in relatively closely spaced and generally parallel relation, electromagnetic actuating means therefor, said diaphragms respectively having peripheral converging portions and radial flanges outwardly extended between the proximate edges of said portions, clamping means passed through said flanges and supporting means for said diaphragms having connections with the flanges only thereof, whereby to support said diaphragms for free vibration.

5. An acoustic signaling device including a pair of diaphragms disposed in relatively closely spaced and generally parallel relation, said diaphragms respectively having peripheral converging portions and radial abutting flanges outwardly extended between the proximate edges of said portions, portions and electro-magnetic actuating means for said diaphragms disposed between them, and a circuit lead extended from said actuating means outwardly and clamped between the flanges of said diaphragms.

6. An acoustic signaling device including a pair of diaphragms disposed in relatively closely spaced and generally parallel relation, said diaphragms having peripheral converging portions, electro-magnetic actuating means for said diaphragms disposed between them, said converging portions being secured together with a gasket interposed therebetween, and a circuit lead extended from said actuating means and outwardly through said gasket.

7. An acoustic signaling device including a pair of substantially duplicate cup-like independently-vibratory diaphragms having their edges secured together forming a chamber, peripheral supporting means for said diaphragms, and electro-magnetic actuating means for and disposed between said diaphragms and including opposed magnet cores carried by and vibratable respectively with said diaphragms, and an energizing winding between the cores.

8. An acoustic signaling device including a pair of independently-vibratory diaphragms disposed in relatively closely spaced and generally parallel relation, peripheral supporting means for said diaphragms, and electro-magnetic actuating means for and disposed between said diaphragms and including relatively flat opposed magnet cores carried flatwise upon and vibratable with said diaphragms, said cores having opposed coil slots, and an energizing coil disposed in said slots, said coil being fixed in the slots in one core and free to vibrate in the slots of the other core.

9. An acoustic signaling device including a pair of vibratory diaphragms, electro-magnetic means for actuating said diaphragms with vibratory movement relative to each other, and a circuit controller for said electro-magnetic means comprising a pair of contact members carried by and movable with one of said diaphragms, and a control member for said circuit controller carried by the other diaphragm.

10. An acoustic signaling device including a pair of vibratory diaphragms disposed in relatively closely spaced and generally parallel relation, electro-magnetic means carried by and disposed between said diaphragms to impart relative vibratory movement thereto, a circuit controller for said electro-magnetic means including a support carried by one of said diaphragms, a pair of contact members carried by said support, and a control member for said contact members carried by said other diaphragm in position to engage with one of said contact members.

11. An acoustic signaling device including a pair of vibratory diaphragms having means securing the peripheries thereof rigidly together, gasket means interposed between the peripheral portions of said diaphragms, electro-magnetic actuating means for said diaphragms disposed between them, and a circuit lead for said actuating means passing through said gasket means.

12. A warning horn including an enclosing casing, a drum having a pair of freely vibratory heads disposed within said casing, electromagnetic means having parts separately carried respectively by said heads for vibrating the same, and supporting means for said drum comprising means connecting said casing and the periphery only of said drum, a free acoustic passage being provided between said drum and said casing.

13. A warning horn including a casing having an open mouth, a drum having a pair of freely vibratory heads disposed within but spaced from the walls of said casing, electromagnetic means having parts separately carried respectively by said heads for vibrating the same, and supporting means within the casing for said drum, and permitting such free vibration of the heads, a free acoustic passage being provided from both vibratory heads to said mouth.

14. A warning horn including a casing having an open mouth and an end wall opposite said mouth, means detachably connecting said end wall with the body of said casing, a drum having two opposed freely vibratory heads disposed within said casing opposite said mouth and adjacent said end wall, electromagnetic means having parts separately carried respectively by said heads for vibrating the same, and supporting means connecting the peripheral portions only of said drum with said casing.

15. A warning horn including a casing having an open mouth and an end wall opposite said mouth, means detachably connecting said end wall with the body of said casing, a drum having two opposed freely vibratory heads disposed within said casing opposite said mouth and adjacent said end wall, electromagnetic means having parts separately carried respectively by said heads for vibrating the same, and supporting means connecting the peripheral portions only of said drum with the casing, a free acoustic passage being provided from both heads to said mouth.

16. The combination of a pair of spaced and independently-vibratory diaphragms, electro-magnetic means between the diaphragms to actuate them, and a circuit-controller for said means, and means operatively connecting said circuit controller to both diaphragms, whereby the diaphragms act conjointly to control the circuit controller.

17. An electric signaling or alarm device comprising a pair of similar independently vibratory diaphragms secured in respect to each other to form a housing for the operating parts of the device, said diaphragms having inflexible center portions of substantial area surrounded by flexible annular areas, and a pair of cooperating substantially similar electro-magnet pole pieces secured respectively to the inside faces of said diaphragms at said inflexible areas.

18. An acoustical signaling device comprising a pair of opposed vibratory diaphragms having means respectively rendering their central portions inflexible and electromagnetic actuating means including one of the aforesaid means and a current interrupter carried by said portions.

19. An acoustical signaling device comprising a pair of adjacent opposed and independently vibratory diaphragms, and electromagnetic actuating means therebetween comprising a pair of cooperating relatively thin flat laminated core members secured respectively flatwise to the center portions of the two diaphragms.

20. An acoustical signaling device comprising a pair of opposed vibratory cup-shaped sheet metal members peripherally joined together and forming a complete enclosure, electrical actuating means therein and rigid supporting means for the device attached along the zone of juncture of said two members.

21. An acoustical signaling device comprising a pair of vibratory members of approximately equal periodicity, electromagnetic means for simultaneously vibrating said members in opposite phase relationship, and a current interrupter for said electromagnetic means actuated conjointly by said vibratory members.

22. In combination a pair of independently and acoustically vibratory members of at least approximately equal natural periodicities, electromagnetic actuating means therefor acting upon each diaphragm independently, and means for initiating and maintaining a pulsating current for said actuating means, the pulsations being synchronized with the vibrations of said members and of a frequency determined conjointly by the natural periodicities of said vibratory members.

23. An acoustical signaling device comprising a pair of opposed independently vibratory diaphragms of substantially equal periodicity, actuating means therefor comprising a cooperating pair of core members of substantially equal weight and separately carried respectively by said two diaphragms.

24. An electro-magnetically actuated warning signal comprising a housing having a chamber and a single sound outlet in direct air communication therewith, and two substantially independently vibratory disc members in the chamber having their vibratory areas free for substantially undampened vibration, and each supported from the chamber walls substantially concentrically in respect to said outlet and both in air communication with said outlet, and electromagnetic means for causing actuation of said vibratory members.

25. An electro-magnetically actuated warning signal comprising a hollow disc-like housing or chamber having a sound outlet in direct air communication therewith, a pair of separately vibratory disc-like members in the chamber, each supported from the chamber walls, said members being mounted substantially in closely adjacent face-to-face relationship and substantially concentric and flatwise in respect to the chamber end walls, at least one of said members being peripherally spaced from the chamber walls to afford air communication between the other member and said outlet, and electro-magnetic means for causing actuation of said vibratory members.

26. A warning signal comprising a sound chamber, a vibratory diaphragm peripherally supported by the chamber walls and with its central area free for substantially undampened vibration, an electro-magnetic means for vibrating said diaphragm, a sound outlet for said chamber, another and substantially separately vibratory member having an area free for substantially undampened vibration and located in the chamber and supported thereby between said diaphragm and said outlet, said outlet being in air communication with said diaphragm and also with said other member for combining the sound waves and any beat frequencies produced thereby into a resultant warning signal.

27. An electro-magnetic signaling device comprising a relatively flat substantially circular housing chamber formed of two cup-shaped parts joined at their peripheries, a pair of complementary vibratory diaphragms joined at their peripheries, electro-magnetic actuating means within the enclosure formed by said diaphragms, said diaphragms being substantially circular and arranged coaxially within said chamber but spaced from the walls thereof, and supporting posts extending from the joined peripheries of the diaphragms to a wall of the housing.

28. A warning signal comprising a relatively flat substantially circular housing formed of two parts joined at their peripheries, a pair of complementary vibratory diaphragms within said housing and also joined at their peripheries, the zones of juncture of the housing parts and said diaphragms being substantially concentric and closely adjacent, means for supporting the diaphragms within the housing, and electromagnetic actuating means within the enclosure formed by said diaphragms.

29. In a traffic signal device, a pair of housing members adapted to be peripherally secured together to form an enclosure, at least one of said members having portions capable of vibrating toward and from the other member, an electromagnet secured centrally upon one of said members and situated adjacent the same, an armature supported centrally upon the other of said members and situated adjacent the same, said electromagnet and armature adapted to be enclosed and cooperatively associated by the juxtaposition of the members, a pair of resilient, conductive elements extending into the enclosure from the periphery thereof, cooperative, conductive elements carried by one of said members, and an interrupter projection carried by the other member and extending outside the lateral bounds of the electromagnet for engaging and flexing one of said elements to interrupt the circuit to the electromagnet upon relative approach of said members.

30. In a traffic signal device, a sound producing structure including a flexible diaphragm, said diaphragm having a vibratable body portion, an annular flange of substantial height, and a radial, circumferential flange substantially offset from the plane of the body portion of the diaphragm, means for fixedly supporting the diaphragm by the circumferential flange, the annular flange being free to flex between the supporting plane and the body plane, and means for effecting sound producing vibration of the diaphragm.

31. An acoustical signaling device comprising a pair of opposed housing members forming an enclosure, of which at least one is a sheet metal diaphragm having a flexible annular portion and an inflexible central portion, electromagnetic means in the enclosure including an armature mounted rigidly on the inflexible central portion of the diaphragm, and interrupter mechanism within the enclosure including an interrupter element mounted on the central inflexible portion of the diaphragm.

32. An acoustical signaling device comprising a pair of opposed housing members forming an enclosure, of which at least one is a sheet metal diaphragm having a flexible annular portion and an inflexible central portion, electromagnetic means in the enclosure including an armature mounted rigidly on the inflexible central portion of the diaphragm, and interrupter mechanism within the enclosure including an adjustable interrupter screw extending through the central rigid portion of the diaphragm to the exterior thereof.

33. In combination, a pair of casing members at least one of which is formed to constitute a vibratable diaphragm, means securing the marginal portions thereof together to provide a complete enclosure, means including an electromagnet and complemental armature fixed upon the respective members within said enclosure at the centers thereof and arranged to effect sound producing flexure of the diaphragm, and an interiorly disposed interrupter located outside the magnet and comprising a pair of contacts relatively movable in substantially the direction of movement of the diaphragm, and a member thrust inward by inward movement of the diaphragm to separate said contacts and thereby to interrupt the current upon relative approach of the members, said interrupter being confined and protected in said enclosure.

34. In combination, a pair of casing members, one of which is formed to constitute a vibratable diaphragm, means connecting the marginal portions thereof to provide a complete enclosure, means including an electromagnet and a complemental armature fixedly supported independently of one another upon the respective members at the centers thereof, the electromagnet being disposed within such enclosure and arranged to effect sound producing flexure of the diaphragm, and an interrupter mounted and protected within said enclosure within the space between said electromagnet and the peripheries of said members and comprising a contact operating element mounted on one of said members, and a pair of contacts mounted independently of said last named member, said operating element thrusting apart the contacts upon relative approach of the members, to separate the contacts and thereby interrupt the current.

35. In a traffic signal device, a sheet metal diaphragm, reinforcing plates mounted on the opposite sides of the diaphragm respectively, and centrally thereof and affixed rigidly thereto at a plurality of spaced points, and clamping the diaphragm between them to form a sound producing member having a rigid center portion and an annular flexible portion.

36. In a traffic signal device, a sheet metal diaphragm, reinforcing plates affixed rigidly at a plurality of spaced points to the opposite sides of the diaphragm respectively and centrally thereof, including a plate formed of magnetic material, said plates clamping the diaphragm between them to form a sound producing member having a rigid center portion and an annular flexible portion.

37. In a traffic signal device, a sheet metal diaphragm, reinforcing plates affixed rigidly at a plurality of spaced points to the opposite sides of the diaphragm respectively, and centrally thereof and clamping the diaphragm between them to form a sound producing member having a rigid center portion and an annular flexible portion, and an interrupter operating element carried on said rigid portion of the diaphragm.

38. In a traffic signal device, a sound producing structure including a diaphragm of flexible sheet metal, a rigid armature plate of magnetic material covering a substantial central area of the inner face of the diaphragm, a rigid plate covering the central area of the outer face of the diaphragm, and through fastenings passed through the diaphragm at spaced points and through marginal portions of said plates and clamping the plates fixedly to the diaphragm and to one another.

39. An acoustical signaling device comprising a pair of opposed housing members forming an enclosure, of which at least one is a sheet metal diaphragm having a flexible annular portion and an inflexible central portion, an electromagnet means in the enclosure carried by the other member, an armature mounted rigidly on the inflexible central portion of the diaphragm, and interrupter mechanism within the enclosure including an interrupter element mounted on the margin of the central inflexible portion of the diaphragm.

40. In a traffic signal device, a sound producing structure including a diaphragm of flexible sheet metal, a rigid armature plate of magnetic material covering a substantial central area of the inner face of the diaphragm, a rigid plate covering the central area of the outer face of the diaphragm, and through fastenings passed through the diaphragm at spaced points through marginal portions of said plates and clamping the plates fixedly to the diaphragm and to one another, an interrupter within the signal device, and a thrust pin for operating said interrupter, said thrust pin being mounted on said armature plate.

41. In a traffic signal device, a sound producing structure including a diaphragm of flexible sheet metal, a rigid armature plate of magnetic material covering a substantial central area of the inner face of the diaphragm, a rigid plate covering the central area of the outer face of the diaphragm, and through fastenings passed through the diaphragm at spaced points through marginal portions of said plates and clamping the plates fixedly to the diaphragm and to one another, an interrupter within the signal device, and mounted independently of said diaphragm, and means at the margin of said armature plate for operating said interrupter.

42. In combination, a pair of casing members, one of which is formed to constitute a vibratable diaphragm, means connecting the marginal portions thereof to provide a complete enclosure, means including an electromagnet and a complemental armature fixedly supported independently of one another upon the respective members at the centers thereof and arranged to effect sound producing flexure of the diaphragm, the electromagnet being disposed within said inclosure and carried by the other member, an interrupter assembly within the enclosure comprising a bracket fixed to one of said members, a pair of superposed relatively movable contact arms carried by said bracket, and contact operating means mounted on the other one of said pair of members for thrusting apart said contact arms to operate the interrupter upon flexure of the diaphragm, means being provided for relatively adjusting the position of said thrusting means and said bracket.

43. In combination, a pair of casing members, one of which is formed to constitute a vibratable diaphragm, means connecting the marginal portions thereof to provide a complete enclosure, an armature including a plate of magnetic material covering a substantial central area of the inner face of the diaphragm, a rigid plate covering the central area of the outer face of the diaphragm, means securing said plates rigidly to the diaphragm, means including an electromagnet fixedly supported on the other of said members at the center thereof and within such enclosure and arranged to effect sound producing flexure of the diaphragm, said electromagnet having a core comprising a central portion embraced by a winding, the core extending around said winding and having portions exterior to the winding terminating at a common plane with the face of said central core portion, and said armature extending substantially flatwise of said diaphragm and said plane in cooperative relationship with said central and exterior core portions.

44. In combination, a pair of casing members, one of which is formed to constitute a vibratable diaphragm, means connecting the marginal portions thereof to provide a complete enclosure, means including an electromagnet and a complemental armature fixedly supported independently of one another upon the respective members at the centers thereof and within such enclosure and arranged to effect sound producing flexure of the diaphragm, said electromagnet having a winding embracing a central core portion and received within outer core portions, said central and outer core portions having substantially coextensive pole faces, and said armature extending flatwise over a substantial portion of the diaphragm area in cooperative relationship with said pole faces, said armature being rigidly affixed substantially throughout its area to the diaphragm by a plurality of spaced fastenings.

45. In combination, a pair of casing members, one of which is formed to constitute a vibratable diaphragm, means connecting the marginal portions thereof to provide a complete enclosure, means including an electromagnet and a complemental armature fixedly supported independently of one another upon the respective members at the centers thereof and arranged to effect sound producing flexure of the diaphragm, said electromagnet carried by the other member and being disposed within said enclosure and having a plurality of pole faces, said armature extending over and rigidly held in contact with an extended area of said diaphragm to render said area inflexible, said diaphragm also having an extended highly flexible marginal area with concentric struck-up portions enhancing such flexibility, and whereby vibrations of said inflexible area and armature may be of substantial magnitude while the variations of the spacing thereof with respect to the several pole faces are caused to be uniform.

46. In combination, a pair of casing members, one of which is formed to constitute a vibratable diaphragm, means connecting the marginal portions thereof to provide a complete enclosure, means including an electromagnet and a complemental armature fixedly supported independently of one another upon the respective members at the centers thereof, the magnet being within such enclosure and arranged to effect sound producing flexure of the diaphragm, said armature extending over and rigidly held in contact with an extended area of said diaphragm, said diaphragm having an extended highly flexible marginal area, an interrupter mounted and protected within said enclosure within the space between said electromagnet and the peripheries of said members and operating means whereby said interrupter is operated upon relative approach of the casing members to separate the interrupter contacts and thereby interrupt the current.

In testimony whereof I have affixed my signature to this specification.

RALPH O. HOOD.

CERTIFICATE OF CORRECTION.

Reissue Patent No. 17,560. Granted January 7, 1930, to

RALPH O. HOOD.

It is hereby certified that the above numbered patent was erroneously issued to "The Boymoto Company, Inc., of New York, N. Y., a corporation of New York, whereas said patent should have been issued to "Moto Meter Guage & Equipment Corporation of Long Island City, N. Y., a corporation of Delaware", said corporation being assignee by mesne assignments of the entire interest in said invention; page 6, line 73, claim 39, strike out the word "means"; and that the said Letters Patent should be read with these corrections therein that the same may conform to the record of the case in the Patent Office.

Signed and sealed this 4th day of February, A. D. 1930.

M. J. Moore,
Acting Commissioner of Patents.

(Seal)